US011267927B2

(12) United States Patent
Ekin et al.

(10) Patent No.: US 11,267,927 B2
(45) Date of Patent: Mar. 8, 2022

(54) AZIDO-ALKYNE CLICK AND OXYSILANE HYBRID COMPOSITIONS

(71) Applicants: Covestro LLC, Pittsburgh, PA (US); The University Of Southern Mississippi, Hattiesburg, MS (US)

(72) Inventors: Alan Ekin, Coraopolis, PA (US); Robson F. Storey, Hattiesburg, MS (US); R. Hunter Cooke, III, Atlanta, GA (US); Harrison A. Livingston, Hattiesburg, MS (US)

(73) Assignees: Covestro LLC, Pittsburgh, PA (US); The University Of Southern Mississippi, Hattiesburg, MS (US)

( * ) Notice: Subject to any disclaimer, the term of this patent is extended or adjusted under 35 U.S.C. 154(b) by 165 days.

(21) Appl. No.: 16/693,943

(22) Filed: Nov. 25, 2019

(65) Prior Publication Data

US 2021/0155737 A1 May 27, 2021

(51) Int. Cl.
| | |
|---|---|
| *C08G 18/12* | (2006.01) |
| *C08G 18/38* | (2006.01) |
| *C08G 18/28* | (2006.01) |
| *C08G 18/34* | (2006.01) |
| *C08G 18/42* | (2006.01) |
| *C08G 18/75* | (2006.01) |
| *C08G 18/76* | (2006.01) |
| *C08G 18/22* | (2006.01) |
| *C08G 18/44* | (2006.01) |
| *C09J 175/04* | (2006.01) |
| *C08G 18/78* | (2006.01) |
| *C09D 175/04* | (2006.01) |
| *C08G 18/24* | (2006.01) |
| *C09J 175/14* | (2006.01) |
| *C09D 175/14* | (2006.01) |

(52) U.S. Cl.
CPC ........... *C08G 18/12* (2013.01); *C08G 18/222* (2013.01); *C08G 18/246* (2013.01); *C08G 18/282* (2013.01); *C08G 18/289* (2013.01); *C08G 18/348* (2013.01); *C08G 18/3893* (2013.01); *C08G 18/4286* (2013.01); *C08G 18/44* (2013.01); *C08G 18/755* (2013.01); *C08G 18/757* (2013.01); *C08G 18/7621* (2013.01); *C08G 18/7837* (2013.01); *C09D 175/04* (2013.01); *C09D 175/14* (2013.01); *C09J 175/04* (2013.01); *C09J 175/14* (2013.01)

(58) Field of Classification Search
CPC .. C08G 18/12; C08G 18/3893; C08G 18/282; C08G 18/348; C08G 18/4286; C08G 18/755; C08G 18/7621; C08G 18/222; C08G 18/44; C08G 18/757; C08G 18/246; C08G 18/289; C08G 18/7837; C09D 175/14; C09D 175/04; C09J 175/04; C09J 175/14

See application file for complete search history.

(56) References Cited

U.S. PATENT DOCUMENTS

| 3,169,949 | A | | 2/1965 | Büning |
| 4,324,879 | A | | 4/1982 | Bock et al. |
| 5,847,134 | A | * | 12/1998 | May ................... C08G 18/0804 |
| | | | | 544/222 |
| 6,831,126 | B2 | | 12/2004 | Gertzmann et al. |
| 7,772,358 | B2 | | 8/2010 | Tang et al. |
| 8,101,238 | B2 | | 1/2012 | Fokin et al. |
| 9,790,398 | B2 | | 10/2017 | Carter et al. |
| 2015/0368530 | A1 | | 12/2015 | Carter et al. |
| 2016/0311973 | A1 | | 10/2016 | Yang et al. |

OTHER PUBLICATIONS

S. R. Davis et al.; "Formation of silica/epoxy hybrid network polymers"; Journal of Non-Crystalline Solids 315 (2003) ; pp. 197-205; Elsevier.
Y. Joshua Du et al.; "Inorganic/organic hybrid coatings for aircraft aluminum alloy substrates"; Progress in Organic Coatings 41 (2001); pp. 226-232; Elsevier.
X. Liu et al.; "Efficient Synthesis of Linear Multifunctional Poly(ethylene glycol) by Copper(I)—Catalyzed Huisgen 1,3-Dipolar Cycloaddition"; Biomacromolecules 2007, 8, pp. 2653-2658; American Chemical Society.
M. Meldal; "Polymer "Clicking" By CuAAC Reactions"; Macromolecular Journals, Macromolecular Rapid Communications 2008, 29, pp. 1016-1051; Wiley InterScience.
H. Ni et al.; "Polyurea/polysiloxane ceramer coatings"; Progress In Organic Coatings 38 (2000); pp. 97-110; Elsevier.
H. Ni et al.; "Acid-catalyzed moisture-curing polyurea/polsiloxane ceramer coatings"; Progress In Organic Coatings 40 (2000); pp. 175-184, Elsevier.
H. Ni et al.; "Moisture-curing alkoxysilane-functionalized isocyanurate coatings"; Macromolecular Chemistry Physics 201 (2000), pp. 722-732, Wiley-VCH.

(Continued)

*Primary Examiner* — Rabon A Sergent

(74) *Attorney, Agent, or Firm* — John E. Mrozinski, Jr.

(57) ABSTRACT

The present invention provides alternative polyurethane composition comprising the reaction product of an azidated polyol and a poly(alkynyl carbamate) prepolymer, wherein the poly(alkynyl carbamate) prepolymer comprises the reaction product of a polyisocyanate, an alkynol, and an oxysilane. The reaction of the polyol and the prepolymer may occur in the presence of a catalyst or at a temperature of from 20° C. to 120° C. The inventive oxysilane and azido-alkyne hybrid click formulations provide comparable performance, and in some cases better performance, to/than urethane and azido-alkyne control click formulations in terms of pencil hardness, MEK double rubs, and glass transition temperature. The inventive alternative polyurethane compositions may be used to provide coatings, adhesives, sealants, films, elastomers, castings, and composites.

24 Claims, No Drawings

(56) References Cited

OTHER PUBLICATIONS

H. Ni et al.; "Preparation and characterization of alkoxysilane functionalized isocyanurates"; Polymer 41 (2000), pp. 57-71, Elsevier.
H. Ni et al.; "Polyurethane/Polysiloxiane Ceramer Coatings: Evaluation of Corrosion Protection"; Macromolecular Materials and Engineering 2000, 287, pp. 470-479, Wiley-VCH.
D. A. Ossipov et al.; "Poly(vinyl alcohol)-Based Hydrogels Formed by "Click Chemistry""; Macromolecules 2006, 39, pp. 1709-1718, American Chemical Society.
H. C. Kolb et al.; "Click Chemistry: Diverse Chemical Function from a Few Good Reactions"; Angew. Chem. Int. Ed. 2001, 40, pp. 2004-2021, Wiley-VCH.
M. D. Soucek et al.; "Nanostructured Polyurethane Ceramer Coatings for Aircraft"; Journal of Coatings Technology; vol. 74, No. 933, Oct. 2002, pp. 126-134, 79th Annual Meeting of the Federation of Societies for Coatings Technology on Nov. 3-5, 2001.
J. Xu et al.; "Synthesis and shape memory effects of Si—O—Si cross linked hybrid polyurethanes"; Polymer 47 (2006), pp. 457-465, Elsevier.
R. Chang et al.; "Synthesis, Characterization, and Properties of Novel Organic/Inorganic Epoxy Hybrids Containing Nitrogen/Silicon via the Sol-Gel Method"; Journal of Applied Polymer Science, vol. 106, pp. 3290-3297 (2007), Wiley InterScience.
D. K. Chattopadhyay et al.; "Structural engineering of polyurethane coatings for high performance applications"; Prog. Polym. Sci. 32 (2007), pp. 352-418, Elsevier.

\* cited by examiner

US 11,267,927 B2

AZIDO-ALKYNE CLICK AND OXYSILANE HYBRID COMPOSITIONS

FIELD OF THE INVENTION

The present invention relates to alternative polyurethane compositions which are reaction products of a poly(alkynyl carbamate) and an azidated polyol. The azide and alkyne groups react in a 1,3-dipolar cycloaddition to form 1,4- and 1,5-disubstituted triazoles. At least one of the poly(alkynyl carbamate) and the azidated polyol contain —O(C=O)—NR— functional groups, wherein R=hydrogen or alkyl. The addition of an alkynol-oxysilane into the polyisocyanate chain results in alternative polyurethane compositions which may be thermally cured or may be cured with catalysts and are suitable for use as coatings, adhesives, sealants, films, elastomers, castings, and composites.

BACKGROUND OF THE INVENTION

"Click chemistry" is a term first used by Sharpless et al. (*Angew. Chem. Int. Ed.* 2001, 40, 2004-2021) to describe a family of synthetic reactions, which attempts to imitate nature by joining small molecules together with heteroatom links. Sharpless et al. stated a number of criteria that a reaction must meet to be considered a "click" type reaction. These criteria include the reaction (a) must be modular; (b) must have a wide scope; (c) must provide high yields; (d) must produce inoffensive by-products (which can be removed by non-chromatographic methods); (e) must be stereospecific; and (f) must involve simple reaction conditions (insensitive to water and oxygen) and product isolation. Finally, the reaction should use readily available starting materials, reactants, and solvents which are easily removed.

One example of a click reaction which has attracted wide attention is the copper catalyzed azide-alkyne cycloaddition (CuAAC). This azide-alkyne cycloaddition was first described by Huisgen in 1963 and was carried out in the absence of a catalyst, requiring elevated temperatures and giving a mixture of products (namely the 1,4 and 1,5-substituted triazoles). The $Cu^I$-catalyzed cycloaddition was discovered independently by Meldal (*Macromol. Rapid. Com.* 2008, 29 (12-13), 1016-1051) and Sharpless et al. The benefit seen with these copper-catalyzed reactions was that they could be performed at room temperature and resulted in the exclusive formation of 1,4-substituted triazole products. Another advantage of this cycloaddition is that the azide and alkyne moieties are generally unreactive towards a wide range of functional groups, which eliminates the need for extensive use of protecting groups. This advantage is a key to the reaction's popularity in a number of scientific fields such as the biomedical field and material science.

Although the initial investigations of 1,3-dipolar cycloadditions via click chemistry focused on the functionalization and attachment of small molecules to biochemical molecules, U.S. Pat. No. 8,101,238 issued to Fokin et al. describes adhesive polymers which are formed from polyvalent alkynes and azides and can be assembled into cross-linked polymer networks by copper catalysis. The Fokin et al. patent describes the formation of coatings on copper metal surfaces which act as a catalyst for the alkynes and azides to form linear polymers including up to 22 units of a diazide and dialkyne or cross-linked polymeric networks. The compositions disclosed in Fokin et al. were proposed for use in applications such as adhesives and coatings and for combination with cement and other materials.

Polymeric triazoles constructed by 1,3-dipolar cycloaddition are also described in U.S. Pat. No. 7,772,358 issued to Tang et al. The compounds of Tang et al. are prepared by thermal conversion at about 100° C. without the addition of a catalyst, which resulted in the formation of both 1,4- and 1,5-disubstituted triazoles. These compositions are described by Tang et al. as being "hyper-branched", which is a result of the exclusive use of tri- or higher substituted alkynes and azides during preparation. The advantage of these compositions is that their preparation does not involve the use of additional solvents or catalysts, which might have detrimental effects on the resulting properties. This benefit, however, is somewhat negated by the need to cure the compositions at elevated temperatures.

Liu, X.-M. et al. in *Biomacromolecules* 2007, 8, 2653-2658, describe the synthesis of linear poly(ethylene glycol)s using 1,3-dipolar cycloaddition for chain extension. Liu et al. disclose that poly(ethylene glycol)s having pendant alkyne moieties are reacted with 2,2-bis(azidomethyl)propane-1,3,diol and copper sulfate/sodium ascorbate.

A significant disadvantage of the above-described reactions is the required use of di- and polyazides, which have relatively high nitrogen contents. For example, Fokin et al. (U.S. Pat. No. 8,101,238) describes compounds having nitrogen contents of up to about 60% in the form of azides. Such compounds are impracticable for industrial application due to the compounds' explosiveness. The compounds of Tang et al. and Xin-Ming et al. have nitrogen contents in the form of azides of about 23% and 43%, respectively, which pose problems when the azide compounds are handled as such.

Ossipov et al. (Macromolecules 2006, 39, 1709-1718) describe the preparation of poly(vinyl alcohol)-based hydrogels via 1,3-dipolar cycloaddition, in which a first poly(vinyl alcohol) is functionalized with azide functionalities and a second poly(vinyl alcohol) is functionalized with alkyne functionalities, and subsequently the two poly(vinyl alcohol)s are reacted with each other by cyclization of the alkyne and azide groups. Ossipov et al. also disclose that azide terminated poly(ethylene glycol)s may be used as a replacement for the azide-modified poly(vinyl alcohol).

Carter et al., in U.S. Pat. No. 9,790,398 disclose the synthesis of both a diazide monomer and a dialkyne monomer from 4,4'-diphenylmethane diisocyanate (MDI). The inventors also created a diazide monomer by reaction of sodium azide with diglycidyl ether of poly(propylene oxide). Carter et al. disclose the synthesis of only one polymer produced by CuAAC catalyzed reaction of azide-functional poly(propylene glycol) diglycidyl ether with the dialkyne of MDI.

U.S. Pat. Pub. No. 2016/0311973 in the name of Yang et al. is directed to waterborne dispersion coatings that cure by a 1,3-dipolar cycloaddition. Yang et al. disclose hexamethylene diisocyanate (HDI)-based polyurethane/urea dispersions possessing pendent propargyl groups, HDI-based polyurethane/urea dispersions possessing pendent azide groups, and also alkyd and acrylic type waterborne polymers possessing either alkyne or azide pendent groups.

Both the Carter et al. and Yang et al. references start from small molecules and polymerize these materials to give the final alternative polyurethane products.

Despite the above-described advancements in technology, the 1,3-dipolar cycloaddition of multivalent azides and alkynes has not been described in combination with pre-polymer precursors to which the azide and alkyne groups have been attached. Such prepolymers would have the advantage that the azide content of a prepolymer relative to its total weight could be low enough to minimize the risk of explosions, while the number of azides in the prepolymer molecules can be higher than two allowing the formation of cross-linked systems.

Organic-inorganic hybrid coatings systems possess unique and superior properties that cannot be achieved using only a single component of the hybrid. The sol-gel technique, an easy and cost-effective method to make hybrid coatings, uniquely establishes chemical linkages between the soft organic and the hard inorganic components. In this way, one can intimately combine the properties of an organic component, such as mechanical toughness and flexibility, with the hardness and thermal stability of an inorganic component, into a single system: see, for example, Y. J. Du, et al. (*Prog. Org, Coat.* 2001, 41, 226-232), and D. K. Chattopadhyay, et al., (*Prog. Polym. Sci.* 2007, 32, 352-418). In the case of silane-based sol-gel systems, the silicon-oxygen bonds of these types of polymers provide the hybrid with a variety of attractive properties.

In the sol-gel process, the inorganic phase is obtained from the hydrolysis and condensation reactions of metal alkoxides of the type $RM(OC_nH_{2n+1})_3$, where R is a suitable organic group and M is Si, Ti, Al, Sn or Zr. The appropriate choice of R enables one to synthesize hybrids with a wide variety of properties. Organosilanes such as (3-aminopropyl)trimethoxysilane (APTMOS) and N-(2-aminoethyl)-3-aminopropyltrimethoxysilane (AEAPTMS) are widely used precursors of silica in the sol-gel process to obtain ceramer coatings. These can be further modified with a tetrafunctional alkoxysilane, such as tetraethylorthosilicate (TEOS).

Alkoxy silane functional polyureas have been synthesized from the reaction of an isocyanurate trimer of hexamethylene diisocyanate and (3-aminopropyl)trimethoxysilane, and they have been used to make a moisture curing hybrid coating: see, for example, H. Ni, et al. (*Polymer* 2000, 41, 57-71), and H. Ni, et al. (*Macromol. Chem. Phys.* 2000, 201, 722-73). Coatings were also prepared incorporating TEOS in addition to the silane modified polyurea; see, for example, H. Ni, et al. (*Prog. Org. Coat.* 2000, 40, 175-184), and H. Ni, et al. (*Prog. Org. Coat.* 2000, 38, 97-110).

A monofunctionalized isocyanurate was prepared from the reaction of one mole of the isocyanurate trimer of hexamethylene diisocyanate and one mole of (3-aminopropyl)trimethoxysilane: see, for example, H. Ni, et al. (*Macromol. Mater. Eng.* 2002, 287, 470-479), and M. D. Soucek, et al. (*J. Coat. Technol.* 2002, 74 (933), 125-134). Hybrid coatings were made from a combination of the monofunctionalized resin, a polyester polyol, and TEOS.

A shape memory polyurethane system was synthesized by first preparing a diol from the Michael reaction of two moles of hydroxylethyl acrylate with (3-aminopropyl)trimethoxysilane. The diol was incorporated into a linear polyurethane and then crosslinked by the hydrolysis-condensation of the silane functional groups: J. Xu, et al. (*Polymer* 2006, 47, 457-465).

An alkoxysilane-functional epoxy resin was prepared by reacting the hydroxyl groups in a bisphenol-A diglycidyl ether epoxy resin with isocyanatopropyltriethoxysilane: R. C. Chang, et al. (*J. Appl. Polym. Sci.* 2007, 106, 3290-3297). An alkoxysilane-functional isocyanurate resin was also prepared from the reaction of triglycidyl isocyanurate with aminopropyltriethoxysilane. The two silane-modified resins were then combined with a polyoxypropylene diamine crosslinker to form the hybrid sol-gel network.

A hybrid epoxy silica hybrid material was synthesized by mixing glycidoxypropyltrimethoxysilane, a bisphenol-A diglycidyl ether epoxy resin, and an amine crosslinker: S. R. Davis, et al. (*J. Non-Crystalline Solids* 2003, 315197-205).

To reduce or eliminate problems, therefore, a need continues to exist in the art for ways of producing alternative polyurethane compositions which rely on simple modification of existing prepolymers.

SUMMARY OF THE INVENTION

Accordingly, the present invention reduces or eliminates problems inherent in the art by providing novel chemical intermediates and methods of preparation, and polyurethane-based compositions made therefrom, that cure without the presence of free isocyanates in the final curing step. Curing of the inventive compositions involves reaction of an alkyne-functional resin with an azide-functional resin (i.e. Huisgen azido-alkyne cycloaddition) and may be carried out at ambient or mild temperatures in the presence of a catalyst at elevated temperatures in the absence of a catalyst.

The present inventors have surprisingly discovered that the addition of an alkynol-oxysilane into the polyisocyanate chain provides comparable performance and in some cases better performance than urethane and azido-alkyne containing formulations. The low chain poly(alkynyl carbamate) polymers are used in azido-alkyne cycloaddition (click) chemistry. The coatings, adhesives, sealants, films, elastomers, castings, and composites of the present invention may be solvent-borne or waterborne.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In a first aspect, the present invention is directed to an alternative polyurethane composition comprising a reaction product of an azidated polyol and a poly(alkynyl carbamate) prepolymer, wherein the poly(alkynyl carbamate) prepolymer comprises a reaction product of stoichiometric equivalents of a polyisocyanate component and an active-hydrogen-containing component, wherein the active-hydrogen-containing component comprises 60-99 mol % of an alkynol, and 1-40 mol % of an oxysilane of the formula (I),

  (I)

wherein, the alkynol and the oxysilane total 100 mol %, and wherein, $X=O$, S, or $NR^3$, and $R^1$=straight or branched $C_1$-$C_{10}$ alkyl or a $C_1$-$C_{10}$ ether, $R^2$=straight or branched $C_1$-$C_{10}$ alkyl, and $R^3$=H or straight or branched $C_1$-$C_{10}$ alkyl.

In a second aspect, the present invention is directed to a process of producing an alternative polyurethane composition comprising reacting an azidated polyol and a poly (alkynyl carbamate) prepolymer, wherein the poly(alkynyl carbamate) prepolymer comprises a reaction product of stoichiometric equivalents of a polyisocyanate component and an active-hydrogen-containing component, wherein the active-hydrogen-containing component comprises 60-99 mol % of an alkynol, and 1-40 mol % of an oxysilane of the formula (I),

  (I)

wherein the alkynol and the oxysilane total 100 mol %, and wherein $X=O$, S, or $NR^3$, $R^1$=straight or branched $C_1$-$C_{10}$ alkyl or a $C_1$-$C_{10}$ ether, $R^2$=straight or branched $C_1$-$C_{10}$ alkyl, and $R^3$=H or $C_1$-$C_{10}$ straight or branched alkyl In a third aspect, the present invention is directed to coatings, adhesives, sealants, films, elastomers, castings, and composites made from the inventive alternative polyurethane compositions. The coatings, adhesives, sealants, films, elastomers, castings, and composites of the present invention may be solvent-borne or waterborne.

Suitable alkyne-functional resins may be prepared by reaction of a traditional polyisocyanate resin such as, for example, DESMODUR N3300, DESMODUR N3200, or DESMODUR XP2580, all commercially available from Covestro, with a propargyl alcohol in the presence of a catalytic amount of dibutyltin dilaurate to produce a poly (propargyl carbamate) resin. Suitable azide-functional resins may be prepared by conversion of polyol resins (e.g., DESMOPHEN 650A, PPG 1000, PPG 2000, SETALUX D A 870) to azidated resins by first reacting the polyol resin with methane sulfonyl chloride in the presence of base followed by displacement of the methanesulfonate by an azide anion using $NaN_3$ under conditions favorable for $S_N2$ chemistry. Formulated mixtures of alkyne and azide resins may be cured at elevated temperatures (e.g., 100° C. to 200° C.) with no catalyst or at lower temperatures (e.g., 20° C. to 140° C.) in the presence of a catalyst to give coatings that have similar properties to their isocyanate-alcohol counterparts.

As used herein, the term "polymer" encompasses prepolymers, oligomers, and both homopolymers and copolymers; the prefix "poly" in this context referring to two or more. As used herein, the term "molecular weight", when used in reference to a polymer, refers to the number average molecular weight, unless otherwise specified.

As used herein, the term "polyol" refers to compounds comprising at least two free hydroxyl groups. Polyols include polymers comprising pendant and terminal hydroxyl groups.

As used herein, the term "coating composition" refers to a mixture of chemical components that will cure and form a coating when applied to a substrate.

The terms "adhesive" or "adhesive composition", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant" or "sealant composition" refers to a composition which may be applied to one or more surfaces to form a protective barrier, for example to prevent ingress or egress of solid, liquid or gaseous material or alternatively to allow selective permeability through the barrier to gas and liquid. In particular, it may provide a seal between surfaces.

A "film composition" refers to a mixture of chemical components that will cure and form a thin flexible strip of material, i.e., a "film".

An "elastomer" refers to a polymeric composition that has high elongation and flexibility or elasticity. Elastomers may be made from natural rubber, polyurethanes, polybutadiene, neoprene, and silicone.

A "casting" or "casting composition" refers to a mixture of liquid chemical components which is usually poured into a mold containing a hollow cavity of the desired shape, and then allowed to solidify.

A "composite" or "composite composition" refers to a material made from two or more polymers, optionally containing other kinds of materials. A composite has different properties from those of the individual polymers/materials which make it up.

The terms "cured," "cured composition" or "cured compound" refer to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As used herein, the term "solventborne" refers to a composition which contains organic solvents rather than water as its primary liquid component.

As used herein, the term "waterborne" refers to a composition, preferably a dispersion, which contains water as its primary liquid component.

The components useful in the present invention comprise a polyisocyanate. As used herein, the term "polyisocyanate" refers to compounds comprising at least two unreacted isocyanate groups, such as three or more unreacted isocyanate groups. The polyisocyanate may comprise diisocyanates such as linear aliphatic polyisocyanates, aromatic polyisocyanates, cycloaliphatic polyisocyanates and aralkyl polyisocyanates.

Suitable polyisocyanates for use in embodiments of the invention include, organic diisocyanates represented by the formula

R(NCO)₂ wherein R represents an organic group obtained by removing the isocyanate groups from an organic diisocyanate having (cyclo)aliphatically bound isocyanate groups and a molecular weight of 112 to 1000, preferably 140 to 400. Preferred diisocyanates for the invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms.

Examples of the organic diisocyanates which are particularly suitable for the present invention include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)-bio-based), and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity oligomers.

Polyisocyanate adducts containing isocyanurate, iminooxadiazine dione, urethane, biuret, allophanate, uretdione and/or carbodiimide groups are also suitable for use in the present invention and may be prepared from the same organic groups, R, described before. Such polyisocyanates may have isocyanate functionalities of 3 or more and can be prepared, for example, by the trimerization or oligomerization of diisocyanates or by the reaction of diisocyanates with polyfunctional compounds containing hydroxyl or amine groups. In certain embodiments, the polyisocyanate is the isocyanurate of hexamethylene diisocyanate, which may be prepared in accordance with U.S. Pat. No. 4,324,879 at col. 3, line 5 to col. 6, line 47.

The polyols useful in the present invention may be either low molecular weight (62-399 Da, as determined by gel permeation chromatography) or high molecular weight (400 to 10,000 Da, as determined by gel permeation chromatography) materials and in various embodiments will have average hydroxyl values as determined by ASTM E222-17, Method B, of between 1000 and 10, and preferably between 500 and 50.

The polyols in the present invention include low molecular weight diols, triols and higher alcohols and polymeric polyols such as polyester polyols, polyether polyols, polycarbonate polyols, polyurethane polyols and hydroxyl-containing (meth)acrylic polymers.

The low molecular weight diols, triols and higher alcohols useful in the present invention are known to those skilled in the art. In many embodiments, they are monomeric and have hydroxyl values of 200 and above, usually within the range of 1500 to 200. Such materials include aliphatic polyols, particularly alkylene polyols containing from 2 to 18 carbon atoms. Examples include ethylene glycol, 1,4-butanediol, 1,6-hexanediol, and cycloaliphatic polyols such as cyclohexane dimethanol. Examples of triols and higher alcohols include trimethylol propane and pentaerythritol. Also useful are polyols containing ether linkages such as diethylene glycol and triethylene glycol.

In various embodiments, the suitable polyols are polymeric polyols having hydroxyl values less than 200, such as 10 to 180. Examples of polymeric polyols include polyalkylene ether polyols, polyester polyols including hydroxyl-containing polycaprolactones, hydroxyl-containing (meth)acrylic polymers, polycarbonate polyols and polyurethane polymers.

Examples of polyether polyols include poly(oxytetramethylene) glycols, poly(oxyethylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher polyols, such as trimethylol propane, pentaerythritol and the like. One commonly utilized oxyalkylation method is reaction of a polyol with an alkylene oxide, for example, ethylene oxide in the presence of an acidic or basic catalyst.

Polyester polyols can also be used as a polymeric polyol component in the certain embodiments of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

The diols which may be employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

In addition to polyester polyols formed from polybasic acids and polyols, polycaprolactone-type polyesters can also be employed. These products are formed from the reaction of a cyclic lactone such as ε-caprolactone with a polyol with primary hydroxyls such as those mentioned above. Such products are described in U.S. Pat. No. 3,169,949.

In addition to the polyether and polyester polyols, hydroxyl-containing (meth)acrylic polymers or (meth)acrylic polyols can be used as the polyol component.

Among the (meth)acrylic polymers are polymers of 2 to 20 percent by weight primary hydroxyl-containing vinyl monomers such as hydroxyalkylacrylate and methacrylate having 2 to 6 carbon atoms in the alkyl group and 80 to 98 percent by weight of other ethylenically unsaturated copolymerizable materials such as alkyl(meth)acrylates; the percentages by weight being based on the total weight of the monomeric charge.

Examples of suitable hydroxyalkyl (meth)acrylates are hydroxy ethyl and hydroxy butyl(meth)acrylate. Examples of suitable alkyl acrylates and (meth)acrylates are lauryl methacrylate, 2-ethylhexyl methacrylate and n-butyl acrylate.

In addition to the acrylates and methacrylates, other copolymerizable monomers which can be copolymerized with the hydroxyalkyl (meth)acrylates include ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, α-methyl styrene, α-methyl chlorostyrene, vinyl butyrate, vinyl acetate, alkyl chloride, divinyl benzene, diallyl itaconate, triallyl cyanurate and mixtures thereof. Preferably, these other ethylenically unsaturated materials are used in admixture with the above-mentioned acrylates and methacrylates.

In certain embodiments of the invention, the polyol may be a polyurethane polyol. These polyols can be prepared by reacting any of the above-mentioned polyols with a minor amount of polyisocyanate (OH/NCO equivalent ratio greater than 1:1) so that free primary hydroxyl groups are present in the product. In addition to the high molecular weight polyols mentioned above, mixtures of both high molecular weight and low molecular weight polyols such as those mentioned above may be used.

Suitable hydroxyl-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

In various embodiments, the azidated polyols are the reaction products of a polyol and methane sulfonyl chloride (or toluenesulfonyl (tosyl), p-bromophenylsulfonyl (brosyl), benzyl) in presence of base, followed by displacement of the methanesulfonate by an azide anion using $NaN_3$. Another method to produce azidated polyols, is the reaction of a polyoxirane compound, for example, a (meth)acrylic polymer containing glycidyl methacrylate comonomer units, with an azide ion using, for example, $NaN_3$. Any polyol, including but not limited to, those disclosed herein may be azidated and useful in the invention.

The azidated polyol useful in the present application may have a nitrogen content derivable from azide relative to the total weight of the molecule in various embodiment of 20 wt.-% or less, in certain embodiments of 18 wt.-% or less, or of 16 wt.-% or less and in selected embodiments of 15 wt.-% or less. Having such a low azide content helps to ensure that the polyols are sufficiently stable against explosive decomposition, such that extensive handling precautions can be avoided. On the other hand, it is preferred that the nitrogen content derivable from azide relative to the total weight of the molecule in the azide polyol in various embodiments is 1 wt.-% or more, in some embodiments, 2 wt.-% or more, in certain embodiments, 5 wt.-% or more and in selected embodiments, 8 wt.-% or more. Such an azide content ensures that the polyols have a sufficiently low viscosity during handling, but also permits the azidated polyol to contain multiple azide groups.

The alternative polyurethane compositions of the present invention are obtained by reacting an azide compound having two or more azide groups attached thereto and an alkyne compound having two or more alkyne groups attached thereto in a 1,3-dipolar cycloaddition of the azide and alkyne groups. This can for example, be achieved by heating the components to temperatures sufficient to affect the cycloaddition such as in various embodiments, at least 100° C., in certain embodiments, at least 120° C. and in selected embodiments, at least 140° C.

The alkyne compound useful in the present invention may be prepared by the reaction of an epoxy compound and an alkyne having functional groups reactive towards epoxies. The resulting product may subsequently be reacted with an alkyne group-containing alkylation agent to obtain an alkyne compound having two or more alkyne groups. In various embodiments, the functional group reactive toward epoxies is an amine or a thiol group, but hydroxyl or carboxyl groups may also be employed as functional groups.

In various embodiments, the alkyne-containing alkylation agent is a propargyl halogenide, in certain embodiments, a propargyl chloride or bromide, as such compounds are readily available and relatively inexpensive.

In certain embodiments, the poly(alkynyl carbamate) prepolymer is obtainable by the reaction of a portion of the isocyanate groups of the polyisocyanate or isocyanate-terminated polyurethane prepolymer with an alkyne having a functional group reactive towards isocyanates. The functional group reactive towards isocyanates may be an amine, hydroxyl or thiol group. The alkyne may be straight chain or branched and contain cyclic moieties. In various embodiments, the alkyne contains from 3 to 10 carbon atoms; in other embodiments from 3 to 8 carbon atoms. In some embodiments, the alkyne having a functional group reactive towards isocyanates is an alkynol. A preferred alkynol for the reaction with polyisocyanates or polyisocyanate prepolymer is propargyl alcohol.

In various embodiments, the alkynol is a propiolate, and in certain embodiments it is 2-hydroxyethylpropiolate (2-HEP).

In certain embodiments, the alkyne is obtained by the reaction of a polyisocyanate or isocyanate-terminated polyurethane prepolymer and an alkyne having a functional group reactive towards isocyanates. The functional group reactive towards isocyanates may be an amine, hydroxyl or thiol group. The alkyne may be straight chain or branched and contain cyclic moieties. In various embodiments, the alkyne contains from 3 to 10 carbon atoms; in other embodiments from 3 to 8 carbon atoms.

The alternative polyurethane compositions of the present invention are obtainable by reacting an azide compound having two or more azide groups attached thereto and an alkyne compound having two or more alkyne groups attached thereto in a 1,3-dipolar cycloaddition of the azide and alkyne groups. This can, for example, be achieved by heating the components to temperatures sufficient to affect the cycloaddition such as in various embodiments, at least 100° C., in certain embodiments, at least 140° C. and in selected embodiments, at least 200° C.

In certain embodiments, the poly(alkynyl carbamate) prepolymer is obtainable by the reaction of a portion of the isocyanate groups of the polyisocyanate or isocyanate-terminated polyurethane prepolymer with a silane. The silanes have the formula H—X—R$^1$—Si(OR$^2$)$_3$, wherein, X=O, S, or NR$^3$, R$^1$=straight or branched C$_1$-C$_{10}$ alkyl or C$_1$-C$_{10}$ ether, R$^2$=straight or branched C$_1$-C$_{10}$ alkyl, and R$^3$=H or straight or branched C$_1$-C$_{10}$ alkyl or (R$^4$O)$_4$Si, and R$^4$ is C$_1$-C$_{10}$ straight or branched alkyl. In selected embodiments, the oxysilane is (3-aminopropyl)trimethoxysilane (APTMOS), tetraethylorthosilicate (TEOS), or combinations thereof. In various embodiments, the oxysilane may be present in an amount ranging from 0.1 to 50 weight percent, in other embodiments, from 1.0 to 40 weight percent, and in certain embodiments, in an amount ranging from 2.0 to 40 weight percent.

In selected embodiments, the oxysilane is selected from (3-aminopropyl)trimethoxysilane, (3-aminopropyl)triethoxysilane, N-(2-aminoethyl)-3-aminopropyltrimethoxysilane. These can be further modified with a tetrafunctional alkoxysilane such as tetraethylorthosilicate (TEOS).

In some embodiments of the present application, the azide/alkyne reaction is conducted in the presence of a Cu$^I$-based catalyst as this allows a significant reduction of the reaction temperature to about ambient temperature (~20° C.). The Cu$^I$-based catalyst may, for example, be a copper-containing surface which contains sufficient Cu$^I$ in the surface layer to provide the required catalytic action. If application of the inventive composition to non copper-containing surfaces is intended, it is necessary that the Cu$^I$-based catalyst come from a copper source which is not attached to the surface of a material to which the alternative polyurethane composition is to be applied.

Suitable copper catalysts of this type can be based on commercially available Cu$^I$ salts such as CuBr or CuI. It has been noted that Cu$^I$ precursors do not provide catalysts with high reactivities in the formation of 1,4-disubstituted triazoles when azide compounds having two or more azide groups attached thereto and alkyne compounds having two or more alkyne groups attached to a molecule are reacted; however, Cu$^{II}$ precursors which are converted to Cu$^I$ by the action of a reducing agent, provide enhanced activity. Suitable Cu$^{II}$ precursors include, but are not limited to, copper (II) sulfate, copper(II) acetate monohydrate, and copper(II) 2-ethylhexanoate. Suitable reducing agents include for example triphenyl phosphine, sodium ascorbate, tin(II) 2-ethylhexanoate, and hydroquinone.

In various embodiments, the alternative polyurethane compositions of the present invention may be used to provide coatings, adhesives, sealants, films, elastomers, castings, and composites.

The alternative polyurethane compositions of the present invention may further include any of a variety of additives such as defoamers, devolatilizers, surfactants, thickeners, flow control additives, colorants (including pigments and dyes) or surface additives.

The alternative polyurethane compositions of the invention may be contacted with a substrate by any methods known to those skilled in the art, including but not limited to, spraying, dipping, flow coating, rolling, brushing, pouring, and the like. In some embodiments, the inventive compositions may be applied in the form of paints or lacquers onto any compatible substrate, such as, for example, metals, plastics, ceramics, glass, and natural materials. In certain embodiments, the inventive composition is applied as a single layer. In other embodiments, the composition of the present invention may be applied as multiple layers as needed.

EXAMPLES

The non-limiting and non-exhaustive examples that follow are intended to further describe various non-limiting and non-exhaustive embodiments without restricting the scope of the embodiments described in this specification. All quantities given in "percents" are understood to be by weight, unless otherwise indicated. For the purpose of mass to mole conversions, reagents with purity of 99% or higher are considered to be 100% pure. Although described herein in the context of a coating, those skilled in the art will appreciate that the principles of the present invention are equally applicable to adhesives, sealants, films, elastomers, castings, and composites.

The following materials were used in preparation of the Examples:

POLYISOCYANATE A an allophanate-modified polyisocyanate having isocyanate equivalent weight of 217.72 g/eq, based on hexamethylene diisocyanate (HDI), and commercially available from Covestro LLC (Pittsburgh, Pa.) as DESMODUR XP 2580 (19.3% NCO);

POLYOL A an acrylic polyol, received as an 80% solids solution in n-BA, commercially available from Allnex as SETALUX DA 870 BA, possessing hydroxyl equivalent weight of 461.02 g/eq (at 100% solids);

AZIDATED POLYOL A a proprietary prepolymer based on POLYOL A, having azide equivalent weight of 532.74 g/eq (at 91.23% solids); the solid % was determined by drying an aliquot in an oven and recording the fraction weight remaining;

4 Å Molecular Sieves Fisher Scientific, Type 4A, Grade 514, 8-12 Mesh beads, 4 Å pore size, activated using a microwave oven prior to use;

ALKYNOL A propargyl alcohol (99%), commercially available from Fisher Scientific; reagent was dried over 4 Å molecular sieves prior to use;

APTMOS (3-aminopropyl)trimethoxysilane (97%), commercially available from Sigma-Aldrich;

POLY(ALKYNYL CARBAMATE) A a proprietary prepolymer based on POLYISOCYANATE A, having alkyne equivalent weight of 273.78 g/eq (at 100% solids);

POLY(ALKYNYL CARBAMATE) B a proprietary prepolymer based on POLYISOCYANATE A, having alkyne equivalent weight of 317.89 g/eq, modified with 10 mol % APTMOS;

POLY(ALKYNYL CARBAMATE) C a proprietary prepolymer based on POLYISOCYANATE A, having alkyne equivalent weight of 373.03 g/eq, modified with 20 mol % APTMOS:

POLY(ALKYNYL CARBAMATE) D a proprietary prepolymer based on POLYISOCYANATE A, having alkyne equivalent weight of 443.93 g/eq, modified with 30 mol % APTMOS;

TEOS tetraethyl orthosilicate, $Si(OC_2H_5)_4$ (≥99.0%), commercially available from Sigma-Aldrich;

MEK methyl ethyl ketone, Certified ACS, commercially available from Sigma-Aldrich;

Ethyl acetate Certified ACS, commercially available from Fisher Scientific;

TEA triethylamine (≥99.5%), commercially available from Sigma-Aldrich; reagent was dried over 4 Å molecular sieves prior to use;

MeCN acetonitrile (OPTIMA), commercially available from Fisher Scientific; solvent was distilled and dried over 4 Å molecular sieves prior to use;

Mesyl-Cl methanesulfonyl chloride (≥99.7%), commercially available from Sigma-Aldrich;

DMF N,N-dimethylformamide (Certified ACS), commercially available from Fisher Scientific;

n-BA n-butyl acetate, ACS reagent, ≥99.5%, commercially available from Sigma-Aldrich, solvent was dried over 4 Å molecular sieves prior to use;

Hexane Certified ACS, commercially available from Fisher Scientific;

Brine saturated aqueous solution of NaCl, prepared by dissolving 450 g NaCl (certified ACS, Fisher Scientific) into 1.2 L of DI water at room temperature;

$MgSO_4$ magnesium sulfate, anhydrous, commercially available from Fisher Scientific;

$NaN_3$ sodium azide (REAGENTPLUS, ≥99.5%), commercially available from Sigma-Aldrich;

DCM dichloromethane (Certified ACS), commercially available from Fisher Scientific; and CATALYST A dibutyltin dilaurate (DBTDL 98%), commercially available from Strem Chemicals.

POLY(ALKYNYL CARBAMATE) A prepolymer was prepared as follows: All glassware was cleaned and dried in an oven overnight. The following procedure was performed in a $N_2$-protected, dry box equipped with a cryostated heptane bath. To a 500 mL, three-neck, round bottom flask equipped with a mechanical stirrer, a thermocouple, and an addition funnel, were charged POLYISOCYANATE A (101.02 g, 0.464 mole isocyanate) and CATALYST A (1.09 g, 1.73 mmol). The system was stirred and allowed to equilibrate at 0° C. for 10 minutes. After equilibration, ALKYNOL A (26.102 g, 0.466 mol) was charged to the addition funnel and added into the stirring solution at initially 1 drop/sec. The addition speed was adjusted so that temperature of the reaction would not exceed 30° C. After the addition, the mixture was allowed to react overnight, and the product of the reaction was characterized by FTIR, $^{13}$C-NMR and $^1$H-NMR.

POLY(ALKYNYL CARBAMATE) B, in which 10 mol % of isocyanate from POLYISOCYANATE A was reacted with APTMOS and the remaining 90 mol % of isocyanate was reacted with ALKYNOL A, was prepared as follows. All glassware was cleaned and dried in an oven overnight. All experiments were performed in a $N_2$ protected glovebag. Before the reaction, all dried glassware and chemical bottles were purged with $N_2$ for an hour in the glove-bag. POLYISOCYANATE A (78.605 g, 0.361 mol isocyanate) and CATALYST A (0.786 g) were charged to a three-neck, 250 mL round bottom flask equipped with a mechanical stirrer, a thermocouple and an addition funnel. APTMOS (6.654 g, 0.036 mol) was added to the addition funnel. The system was sealed with rubber septa, and allowed to stir and equilibrate in a hexane bath at 0° C. After the equilibration, APTMOS was added into the stirring solution at initially 1 drop/sec. The addition speed was adjusted so that temperature of the reaction would not exceed 30° C. At this point, ALKYNOL A (18.214 g, 0.325 mol) was added to the addition funnel. The same temperature precautions were taken during the addition of ALKYNOL A that were taken during the addition of APTMOS. After the addition, the mixture was allowed to react overnight at room temperature and the product of the reaction was characterized by $^1$H-NMR.

POLY(ALKYNYL CARBAMATE) C, in which 20 mol % of isocyanate from ISOCYANATE A was reacted with APTMOS and the remaining 80 mol % of isocyanate was reacted with ALKYNOL A, was prepared using a procedure analogous to that used to prepare POLY(ALKYNYL CARBAMATE) B. To achieve this, ISOCYANATE A (75.085 g), CATALYST A (0.751 g), APTMOS (12.938 g), and ALKYNOL A (15.473 g) were used.

POLY(ALKYNYL CARBAMATE) D, in which 30 mol % of isocyanate from ISOCYANATE A was reacted with APTMOS and the remaining 70 mol % of isocyanate was reacted with ALKYNOL A, was prepared using a procedure analogous to that used to prepare POLY(ALKYNYL CARBAMATE) B. To achieve this, ISOCYANATE A (75.005 g), CATALYST A (0.790 g), APTMOS (19.038 g), and ALKYNOL A (13.519 g) were used.

AZIDATED POLYOL A was prepared as follows. All glassware was cleaned and dried in an oven overnight. The following procedure was performed in a $N_2$-protected dry box equipped with a cryostated heptane bath. To a one-liter, two-neck round bottom flask equipped with a mechanical stirrer and an addition funnel, POLYOL A (151.2 g, 0.262 mol), TEA (55.0 mL, 0.395 mol), and MeCN (300 mL) were charged. The mixture was stirred and allowed to equilibrate at 0° C. for 10 minutes. After equilibration, a solution of mesyl-Cl (24.0 mL, 0.310 mol) in MeCN (50 mL) was charged to the addition funnel and added into the stirring solution at 1 drop/sec. After the addition, the mixture was allowed to react overnight.

The reaction flask was transferred out of the dry box, and the mixture was filtered to remove the TEA salts. MeCN and excess TEA were vacuum stripped, and the mesylated resin was re-dissolved into ethyl acetate (500 mL). The solution was washed with 20/80 (v/v) brine/DI water mixture (3×300 mL) and then brine (300 mL) and dried with $MgSO_4$ overnight. Ethyl acetate was removed by vacuum stripping to afford the mesylated POLYOL A as an intermediate. An aliquot was taken to perform FTIR, $^{13}$C-NMR, and $^1$H-NMR characterization.

The mesylated resin was re-dissolved in 300 mL MeCN and 30 mL DMF, in a one liter, one-neck round bottom flask. $NaN_3$ (20.0 g, 0.308 mol) and a stir bar were added to the mixture, and the flask was equipped with a condenser sealed with a rubber septum with a needle. The mixture was stirred at 95° C. for 16 hours, allowed to cool to room temperature, and filtered to remove the Na mesylate salts. MeCN was vacuum stripped, and the azidated resin was re-dissolved into ethyl acetate (500 mL). The solution was washed with 20/80 (v/v), brine/water mixture (3×300 mL) and then brine (3×300 mL) and dried with $MgSO_4$ overnight. The final product, AZIDATED POLYOL A, was isolated by removal of ethyl acetate by vacuum stripping and thereafter characterized by FTIR, $^{13}$C-NMR, and $^1$H-NMR. An aliquot of the product was placed on an aluminum pan and dried in the oven at 100° C. for one hour.

Organics, further dried using activated molecular sieves prior to use), and the resulting solution was charged to a 5 mm NMR tube.

For $^{13}$C NMR, typical acquisition parameters were 1 second recycle delay, 11 ms pulse corresponding to a 45° flip angle, and an acquisition time of 0.908 s. The number of scans acquired for each sample was 1024. All $^{13}$C chemical shifts were referenced to residual chloroform (77.16 ppm). Sample solutions were prepared at a concentration of approximately 30% in $CDCl_3$, and the resulting solution was charged to a 5 mm NMR tube.

FORMULATION A was prepared as follows (see Table 1). POLYOL A (3.105 g) and POLYISOCYANATE A (1.174 g) were added to a scintillation vial. The mixture was placed in a FLAKTECH mixer and mixed at 1800 rpm for 20-30 minutes until a homogenous mixture was obtained. Meanwhile, smooth-finish steel panels (Type QD, Q-Lab Corporation) and polyethylene (PE) films were treated with acetone rinsing to remove surface contaminants. Formulation A was then drawn down onto the prepared panels and PE films using a 6 mil wet drawdown bar.

FORMULATION B was prepared as follows (see Table 1). AZIDATED POLYOL A (3.079 g) and POLY(ALKYNYL CARBAMATE) A (1.582 g) were added to a scintillation vial. The mixture was diluted with 0.44 g n-BA, placed in a FLAKTECH mixer, and mixed at 1800 rpm for 20-30 minutes until a homogenous mixture was obtained. Meanwhile, smooth-finish steel panels (Type QD, Q-Lab Corporation) and polyethylene (PE) films were treated with acetone rinsing to remove surface contaminants. Formulation B was then drawn down onto the prepared panels and PE films using a 6 mil wet drawdown bar.

TABLE I

| Component | Formulation[a] | | | | | | | | | | | | | |
|---|---|---|---|---|---|---|---|---|---|---|---|---|---|---|
| | A | B | C | D | E | F | G | H | I | J | K | L | M | N |
| POLYISOCYANATE A | 1.174 | — | — | — | — | — | — | — | — | — | — | — | — | — |
| POLYOL A | 3.105 | — | — | — | — | — | — | — | — | — | — | — | — | — |
| POLY(ALKYNYL CARBAMATE) A | — | 1.582 | — | — | — | — | — | — | — | — | — | — | — | — |
| POLY(ALKYNYL CARBAMATE) B | — | — | 3.810 | — | 3.807 | — | 3.801 | — | — | 3.792 | — | — | — | — |
| POLY(ALKYNYL CARBAMATE) C | — | — | — | 4.200 | — | 4.188 | — | 4.176 | — | — | — | 4.152 | — | — |
| POLY(ALKYNYL CARBAMATE) D | — | — | — | — | 4.635 | — | — | 4.614 | — | 4.593 | — | — | — | 4.554 |
| AZIDATED POLYOL A | — | 3.079 | 6.385 | 5.998 | 5.562 | 6.380 | 5.981 | 5.537 | 6.370 | 5.964 | 5.512 | 6.355 | 5.930 | 5.465 |
| TEOS | — | — | — | — | — | 0.012 | 0.029 | 0.046 | 0.025 | 0.058 | 0.092 | 0.050 | 0.116 | 0.183 |
| n-BA | — | 0.440 | 0.510 | 0.510 | 0.510 | 0.510 | 0.510 | 0.510 | 0.510 | 0.510 | 0.510 | 0.510 | 0.510 | 0.510 |

[a]All quantities given in grams

Fourier transform infrared spectroscopy (FTIR) studies were conducted using a NICOLET 8700 spectrometer with a KBr beam splitter and a DTGS detector. Samples were sandwiched between two NaCl salt plates (polished with DCM) of approximate thickness of 5 mm.

Proton nuclear magnetic resonance ($^1$H NMR) spectra and carbon nuclear magnetic resonance ($^{13}$C NMR) spectra were obtained using a 600.13 MHz Varian Mercury$^{plus}$ NMR (VNMR 6.1C) spectrometer. For $^1$H NMR, typical acquisition parameters were 8 s recycle delay, 7.8 μs pulse corresponding to a 45° flip angle, and an acquisition time of 1.998 s. The number of scans acquired for each sample was 64. All $^1$H chemical shifts were referenced to tetramethylsilane (TMS) (0 ppm). Sample solutions were prepared at a concentration of approximately 5-10% in deuterated chloroform ($CDCl_3$) (99.8+ atom % D, 0.03 v/v % TMS) (Acros FORMULATIONS C, D, and E were prepared following a procedure analogous to that described for FORMULATION B, with the ingredient amounts as provided in Table I.

FORMULATIONS F, G, H, I, J, K, L, M, and N were prepared following a procedure analogous to that described for FORMULATIONS B through E. However, TEOS was added into formulations F through N, as presented in Table I.

Coatings made from FORMULATION A and FORMULATION B were placed in a VWR Shel lab HF2 oven and subjected to the following preprogrammed curing profile: the solvent was allowed to flash at 30° C. for two hours, and the temperature was ramped up to 100° C. at 1° C./min. The coatings were cured at 100° C. for four hours and cooled to 30° C.

Coatings made from FORMULATIONS C through N were each subjected to two contrasting curing procedures, referred to as Curing Procedure A and Curing Procedure B. For each of FORMULATIONS C through N, equal numbers of smooth-finish steel panels (Type QD, Q-Lab Corporation) and polyethylene (PE) films were prepared and labeled as "Set A" and "Set B." Set A coated panels and PE films were subjected to Curing Procedure A, consisting of oven curing first, followed by moisture curing. Set B coated panels and PE films were subjected to Curing Procedure B, consisting of moisture curing first, followed by oven curing.

Set A coated panels and PE films were placed in a VWR Shel lab HF2 oven and subjected to the following pre-programmed curing profile: the solvent was allowed to flash at 30° C. for two hours, the temperature was ramped up to 100° C. at 1° C./min. The coatings were cured at 100° C. for four hours and cooled to 30° C. After this complete oven curing profile, the coatings were placed in a fume hood and subjected to atmosphere moisture curing at room temperature for two weeks. Coating tests were performed 12 hours after completion of this entire curing profile.

Set B coated panels and PE films were first placed in a fume hood for atmosphere curing at room temperature for two weeks, and then placed in the oven and cured with the same complete oven curing profile as described for Set A. Coating tests were performed 12 hours after completion of this entire curing profile.

Differential scanning calorimetry (DSC) was performed using a TA Instruments Q200. For this purpose, coatings were prepared and cured on polyethylene (PE) film substrate. The coatings, which had little adhesion to the PE film, were easily peeled off and punched to give circular samples (d=0.25 in. (6.35 mm)) of the coating films. Stacks of five such samples (total ~5 mg) per coating were placed in a hermetically sealed $T_{zero}$ pan. A heat/cool/heat cycle was performed on each stack starting at −50° C. and ending at 200° C. at a rate of 10° C./min. The glass transition temperature ($T_g$) of the cured material was determined from the second heating cycle, and TA Universal Analysis software was used to determine the midpoint of the $T_g$ inflection as the reported value.

Each coating formulation, for each curing procedure, was applied onto three smooth-finish steel panels (Type QD, Q-Lab Corporation). Each coating test was conducted in triplicate (one replicate per panel). Coating tests were performed 12 hours after the complete curing profile.

Reaction conversion/crosslink density was qualitatively compared via an MEK double rubs test up to 200 rubs using a 32 oz. (0.907 kg) hammer covered by four folds of cheesecloth according to ASTM D5402-15. Hardness was measured via a pencil hardness test in accordance with ASTM D3363-05

As can be appreciated by reference to Table I; Formulation A was a polyurethane control coating. FORMULATION B azido-alkyne click control coating. FORMULATIONS C, D, and E were coatings made with oxysilane-modified alkyne prepolymers POLY(ALKYNYL CARBAMATE)S B, C, and D, respectively. The oxysilane content of POLY (ALKYNYL CARBAMATE)S B, C, and D was 10, 20, and 30 mol % respectively. FORMULATIONS F, G, and H were formulated with POLY(ALKYNYL CARBAMATE)S B, C, and D, respectively. In addition, FORMULATIONS F, G, and H contained 5 mol % (relative to molar amount of the oxysilane component) TEOS for additional curing of the oxysilane component. FORMULATIONS I, J, and K were formulated with POLY(ALKYNYL CARBAMATE)S B, C, and D, respectively. FORMULATIONS I, J, and K contained 10 mol % (relative to molar amount of the oxysilane component) TEOS for additional curing of the oxysilane component. FORMULATIONS L, M, and N were formulated with POLY(ALKYNYL CARBAMATE)S B, C, and D, respectively. In addition, FORMULATIONS L, M, and N contained 20 mol % (relative to molar amount of the oxysilane component) TEOS for additional curing of the oxysilane component.

As can be appreciated by reference to Table II (Curing Procedure A) and Table III (Curing Procedure B), azido-alkyne click and oxysilane hybrid coating formulations can be prepared using APTMOS and TEOS. As can be clearly seen, the inventive oxysilane and azido-alkyne click formulations provide comparable performance, and in some cases better performance, to/than polyurethane and azido-alkyne click control formulations in terms of pencil hardness, MEK double rubs, and glass transition temperature.

TABLE II

| Test (Set A curing) | Formulation | | | | | | | | | | | | | |
|---|---|---|---|---|---|---|---|---|---|---|---|---|---|---|
| | A | B | C | D | E | F | G | H | I | J | K | L | M | N |
| PENCIL HARDNESS | 6H | 8H | 8H | 8H | 7H | 8H | 8H | 7H | 8H | 8H | 7H | 8H | 8H | 7H |
| MEK DOUBLE RUBS | >200 | >200 | >200 | >200 | >200 | >200 | >200 | >200 | >200 | >200 | >200 | >200 | >200 | >200 |
| $T_g$ ° C. (DSC) | 46.95 | 34.87 | 34.32 | 35.46 | 36.59 | 36.47 | 35.21 | 38.17 | 36.43 | 38.06 | 34.37 | 36.19 | 37.97 | 35.11 |
| TEOS (mol %) | 0 | 0 | 0 | 0 | 0 | 5 | 5 | 5 | 10 | 10 | 10 | 20 | 20 | 20 |

TABLE III

| Test (Set B curing) | Formulation | | | | | | | | | | | | | |
|---|---|---|---|---|---|---|---|---|---|---|---|---|---|---|
| | A | B | C | D | E | F | G | H | I | J | K | L | M | N |
| PENCIL HARDNESS | 6H | 8H | 9H | 8H | 7H | 9H | 8H | 7H | 9H | 8H | 8H | 9H | 8H | 7H |
| MEK DOUBLE RUBS | >200 | >200 | >200 | >200 | >200 | >200 | >200 | >200 | >200 | >200 | >200 | >200 | >200 | >200 |

TABLE III-continued

| Test (Set B curing) | Formulation | | | | | | | | | | | | | |
|---|---|---|---|---|---|---|---|---|---|---|---|---|---|---|
| | A | B | C | D | E | F | G | H | I | J | K | L | M | N |
| $T_g$ °C. (DSC) | 46.95 | 34.87 | 35.92 | 40.01 | 40.21 | 36.16 | 42.54 | 42.73 | 36.20 | 40.22 | 39.83 | 36.92 | 40.15 | 38.39 |
| TEOS (mol %) | 0 | 0 | 0 | 0 | 0 | 5 | 5 | 5 | 10 | 10 | 10 | 20 | 20 | 20 |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. An alternative polyurethane composition comprising a reaction product of an azidated polyol and a poly(alkynyl carbamate) prepolymer, wherein the poly(alkynyl carbamate) prepolymer comprises a reaction product of stoichiometric equivalents of a polyisocyanate component and an active-hydrogen-containing component, wherein the active-hydrogen-containing component comprises 60-99 mol % of an alkynol, and 1-40 mol % of an oxysilane of the formula (I),

wherein, the alkynol and the oxysilane total 100 mol %, and wherein, X=O, S, or $NR^3$, and $R^1$=straight or branched $C_1$-$C_{10}$ alkyl or a $C_1$-$C_{10}$ ether, $R^2$=straight or branched $C_1$-$C_{10}$ alkyl, and $R^3$=H or straight or branched $C_1$-$C_{10}$ alkyl.

Clause 2. The alternative polyurethane composition according to Clause 1, wherein the alkynol contains from 3 to 10 carbon atoms.

Clause 3. The alternative polyurethane composition according to one of Clauses 1 and 2, wherein the alkynol is propargyl alcohol or 2-hydroxyethylpropiolate.

Clause 4. The alternative polyurethane composition according to any one of Clauses 1 to 3, wherein the polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, α,α,α',α'-tetramethyl-1,3-xylene diisocyanate, α,α,α',α'-tetramethy-1,4-xylene diisocyanate, 1-isocyanato-1-methyl-4(3)-isocyanato-methyl cyclohexane, 2,4-hexahydrotoluene diisocyanate, 2,6-hexahydrotoluene diisocyanate, toluene diisocyanate (TDI), diphenylmethane diisocyanate (MDI), pentane diisocyanate (PDI)—biobased), and, isomers of any of these; or mixtures of any of these.

Clause 5. The alternative polyurethane composition according to any one of Clauses 1 to 4, wherein the polyisocyanate contains one selected from the group consisting of isocyanurate, biuret, allophanate, uretdione, and iminooxadiazine dione groups.

Clause 6. The alternative polyurethane composition according to any one of Clauses 1 to 5, wherein the azidated polyol is the reaction product of a polyol and an azide anion.

Clause 7. The alternative polyurethane composition according to any one of Clauses 1 to 6, wherein the azidated polyol is the reaction product of a polyol and methane sulfonyl chloride in presence of base, followed by displacement of methanesulfonate by an azide anion.

Clause 8. The alternative polyurethane composition according to one of Clauses 6 and 7, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols and combinations thereof.

Clause 9. The alternative polyurethane composition according to any one of Clauses 1 to 8, wherein the oxysilane is selected from the group consisting of (3-aminopropyl)trimethoxysilane, (3-aminopropyl)triethoxysilane, and N-(2-aminoethyl) 3-aminopropyl trimethoxysilane.

Clause 10. The alternative polyurethane composition according to Clause 1 further modified with from 5 mol % to 20 mol %, relative to the molar amount of oxysilane of the formula (I), of a tetrafunctional alkoxysilane of the formula (II),

wherein $R^4$=straight or branched $C_1$-$C_{10}$ alkyl.

Clause 11. The alternative polyurethane composition according to Clause 10, wherein the tetrafunctional alkoxysilane modification is 5 mol %, relative to the molar amount of oxysilane of the formula (I).

Clause 12. The alternative polyurethane composition according to Clause 10, wherein the tetrafunctional alkoxysilane modification is 10 mol %, relative to the molar amount of oxysilane of the formula (I).

Clause 13. The alternative polyurethane composition according to Clause 10, wherein the tetrafunctional alkoxysilane modification is 20 mol %, relative to the molar amount of oxysilane of the formula (I).

Clause 14. One of a coating, an adhesive, a sealant, a film, an elastomer, a casting, and a composite comprising the alternative polyurethane composition according to any one of Clauses 1 to 13 cured at a temperature of from 100° C. to 200° C.

Clause 15. One of a coating, an adhesive, a sealant, a film, an elastomer, a casting, and a composite comprising the alternative polyurethane composition according to any one of Clauses 1 to 13 cured at a temperature of from 20° C. to 140° C. in the presence of $Cu^I$-containing catalyst.

Clause 16. The alternative polyurethane composition according to Clause 15, wherein the $Cu^I$-containing catalyst comprises a $Cu^{II}$ catalyst and a reducing agent.

Clause 17. The alternative polyurethane composition according to Clause 16, wherein the $Cu^{II}$ catalyst is selected from the group consisting of copper(II) chloride, $CuCl_2$ [PMDETA], copper(II) bromide, copper(II) iodide, copper (II) sulfate, copper(II) 2-ethylhexanoate, and copper(II) acetate monohydrate.

Clause 18. The alternative polyurethane composition according to one of Clauses 15 and 16, wherein the reducing agent is selected from the group consisting of triphenyl phosphine, sodium ascorbate, tin(II) 2-ethylhexanoate, and hydroquinone.

Clause 19. A substrate having applied thereto the one of a coating, an adhesive, a sealant, a film, an elastomer, a casting, and a composite according to one of Clauses 14 and 15.

Clause 20. A process of protecting a substrate comprising contacting at least a portion of the substrate with one of a coating, an adhesive, a sealant, a film, and an elastomer comprising the alternative polyurethane composition according to any one of Clauses 1 to 15, and curing the coating, adhesive, sealant, film, or elastomer.

Clause 21. A process of producing an alternative polyurethane composition comprising reacting an azidated polyol and a poly(alkynyl carbamate) prepolymer, wherein the poly(alkynyl carbamate) prepolymer comprises a reaction product of stoichiometric equivalents of a polyisocyanate component and an active-hydrogen-containing component, wherein the active-hydrogen-containing component comprises 60-99 mol % of an alkynol, and 1-40 mol % of an oxysilane of the formula (I),

$$\text{H—X—R}^1\text{—Si(OR}^2)_3 \quad (I)$$

wherein the alkynol and the oxysilane total 100 mol %, and wherein X=O, S, or $NR^3$, $R^1$=straight or branched $C_1$-$C_{10}$ alkyl or a $C_1$-$C_{10}$ ether, $R^2$=straight or branched $C_1$-$C_{10}$ alkyl, and $R^3$=H or $C_1$-$C_{10}$ straight or branched alkyl.

Clause 22. The process according to Clause 21, wherein the alkynol contains from 3 to 10 carbon atoms.

Clause 23. The process according to one of Clauses 21 and 22, wherein the alkynol is propargyl alcohol or 2-hydroxyethylpropiolate.

Clause 24. The process according to any one of Clauses 21 to 23, wherein the polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, α,α,α',α'-tetramethyl-1,3-xylene diisocyanate, α,α,α',α'-tetramethyl-1,4-xylene diisocyanate, 1-isocyanato-1-methyl-4(3)-isocyanato-methyl cyclohexane, 2,4-hexahydrotoluene diisocyanate, 2,6-hexahydrotoluene diisocyanate, toluene diisocyanate (TDI), diphenylmethane diisocyanate (MDI), pentane diisocyanate (PDI)—bio-based), and, isomers of any of these; or mixtures of any of these.

Clause 25. The process according to any one of Clauses 21 to 24, wherein the polyisocyanate contains one selected from the group consisting of isocyanurate, biuret, allophanate, uretdione, and iminooxadiazine dione groups.

Clause 26. The process according to any one of Clauses 21 to 25, wherein the azidated polyol is the reaction product of a polyol and an azide anion.

Clause 27. The process according to any one of Clauses 21 to 26, wherein the azidated polyol is the reaction product of a polyol and methane sulfonyl chloride in presence of base, followed by displacement of methanesulfonate by an azide anion.

Clause 28. The process according to one of Clauses 26 and 27, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols and combinations thereof.

Clause 29. The process according to any one of Clauses 21 to 28, wherein the oxysilane is selected from the group consisting of (3-aminopropyl)trimethoxysilane, (3-aminopropyl)triethoxysilane, N-(2-aminoethyl) 3-aminopropyl trimethoxysilane.

Clause 30. The process according Clause 21 further including modifying the alternative polyurethane composition with from 5 mol % to 20 mol %, relative to the molar amount of oxysilane of the formula (I), of a tetrafunctional alkoxysilane of the formula (II),

$$\text{Si(OR}^4)_4 \quad (II)$$

wherein $R^4$=straight or branched $C_1$-$C_{10}$ alkyl.

Clause 31. The process according to Clause 30, wherein the tetrafunctional alkoxysilane modification is 5 mol %, relative to the molar amount of oxysilane of the formula (I).

Clause 32. The process according to Clause 30, wherein the tetrafunctional alkoxysilane modification is 10 mol %, relative to the molar amount of oxysilane of the formula (I).

Clause 33. The process according to Clause 30, wherein the tetrafunctional alkoxysilane modification is 20 mol %, relative to the molar amount of oxysilane of the formula (I).

What is claimed is:

1. An alternative polyurethane composition comprising a reaction product of an azidated polyol and a poly(alkynyl carbamate) prepolymer, wherein the poly(alkynyl carbamate) prepolymer comprises a reaction product of stoichiometric equivalents of:
   (a) a polyisocyanate, and
   (b) an active-hydrogen-containing component, wherein the active-hydrogen-containing component comprises 60-99 mol % of an alkynol, and 1-40 mol % of an oxysilane of the formula (I),

$$\text{H—X—R}^1\text{—Si(OR}^2)_3, \quad (I)$$

wherein the alkynol and the oxysilane total 100 mol %, and wherein
X=O, S, or $NR^3$,
$R^1$=straight or branched $C_1$-$C_{10}$ alkyl or a $C_1$-$C_{10}$ ether,
$R^2$=straight or branched $C_1$-$C_{10}$ alkyl, and
$R^3$=H or straight or branched $C_1$-$C_{10}$ alkyl.

2. The alternative polyurethane composition according to claim 1, wherein the alkynol contains from 3 to 10 carbon atoms.

3. The alternative polyurethane composition according to claim 1, wherein the alkynol is propargyl alcohol or 2-hydroxyethylpropiolate.

4. The alternative polyurethane composition according to claim 1, wherein the polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, α,α,α',α'-tetramethyl-1,3-xylene diisocyanate, α,α,α',α'-tetramethy-1,4-xylene diisocyanate, 1-isocyanato-1-methyl-4(3)-isocyanato-methyl cyclohexane, 2,4-hexahydrotoluene diisocyanate, 2,6-hexahydrotoluene diisocyanate, toluene diisocyanate (TDI), diphenylmethane diisocyanate (MDI), pentane diisocyanate (PDI)—bio-based), isomers of any of these and mixtures of any of these.

5. The alternative polyurethane composition according to claim 1, wherein the polyisocyanate contains one selected from the group consisting of isocyanurate, biuret, allophanate, uretdione, and iminooxadiazine dione groups.

6. The alternative polyurethane composition according to claim 1, wherein the azidated polyol is the reaction product of a polyol and an azide anion.

7. The alternative polyurethane composition according to claim 6, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols and combinations thereof.

8. The alternative polyurethane composition according to claim 1, wherein the oxysilane is selected from the group consisting of (3-aminopropyl)trimethoxysilane, (3-aminopropyl)triethoxysilane, and N-(2-aminoethyl) 3-aminopropyl trimethoxysilane.

9. The alternative polyurethane composition according to claim 1 further modified with from 5 mol % to 20 mol % (relative to molar amount of the oxysilane component) of a tetrafunctional alkoxysilane of the formula (II)

wherein $R^4$=straight or branched $C_1$-$C_{10}$ alkyl.

10. One of a coating, an adhesive, a sealant, a film, an elastomer, a casting, and a composite comprising the alternative polyurethane composition according to claim 1 cured at a temperature of from 100° C. to 200° C.

11. One of a coating, an adhesive, a sealant, a film, an elastomer, a casting, and a composite comprising the alternative polyurethane composition according to claim 1 cured at a temperature of from 20° C. to 140° C. in the presence of $Cu^I$-containing catalyst.

12. The coating, adhesive, sealant, film, elastomer, casting, or composite according to claim 11, wherein the $Cu^I$-containing catalyst comprises a $Cu^{II}$ catalyst and a reducing agent.

13. The coating, adhesive, sealant, film, elastomer, casting, or composite according to claim 12, wherein the $Cu^{II}$ catalyst is selected from the group consisting of copper(II) chloride, $CuCl_2$[PMDETA], copper(II) bromide, copper(II) iodide, copper(II) sulfate, copper(II) 2-ethylhexanoate, and copper(II) acetate monohydrate.

14. The coating, adhesive, sealant, film, elastomer, casting, or composite according to claim 12, wherein the reducing agent is selected from the group consisting of triphenyl phosphine, sodium ascorbate, tin(II) 2-ethylhexanoate, and hydroquinone.

15. A substrate having applied thereto the one of a coating, an adhesive, a sealant, a film, an elastomer, a casting, and a composite according to claim 11.

16. A process of protecting a substrate comprising contacting at least a portion of the substrate with one of a coating, an adhesive, a sealant, a film, and an elastomer comprising the alternative polyurethane composition according to claim 1, and curing the coating, adhesive, sealant, film, or elastomer.

17. A process of producing an alternative polyurethane composition comprising:
reacting an azidated polyol and a poly(alkynyl carbamate) prepolymer, wherein the poly(alkynyl carbamate) prepolymer comprises a reaction product of stoichiometric equivalents of:
(a) a polyisocyanate, and
(b) an active-hydrogen-containing component, wherein the active-hydrogen-containing component is comprised of 60-99 mol % of an alkynol, and 1-40 mol % of an oxysilane of the formula (I),

wherein, the alkynol and the oxysilane total 100 mol %, and wherein
X=O, S, or $NR^3$,
$R^1$=straight or branched $C_1$-$C_{10}$ alkyl or a $C_1$-$C_{10}$ ether,
$R^2$=straight or branched $C_1$-$C_{10}$ alkyl, and
$R^3$=H or $C_1$-$C_{10}$ straight or branched alkyl.

18. The process according to claim 17, wherein the alkynol contains from 3 to 10 carbon atoms.

19. The process according to claim 17, wherein the alkynol is propargyl alcohol or 2-hydroxyethylpropiolate.

20. The process according to claim 17, wherein the polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, α,α,α',α'-tetramethyl-1,3-xylene diisocyanate, α,α,α',α'-tetramethy-1,4-xylene diisocyanate, 1-isocyanato-1-methyl-4(3)-isocyanato-methyl cyclohexane, 2,4-hexahydrotoluene diisocyanate, 2,6-hexahydrotoluene diisocyanate, toluene diisocyanate (TDI), diphenylmethane diisocyanate (MDI), pentane diisocyanate (PDI)—bio-based), isomers of any of these and mixtures of any of these.

21. The process according to claim 17, wherein the azidated polyol is the reaction product of a polyol and an azide anion.

22. The process according to claim 21, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols and combinations thereof.

23. The process according to claim 17, wherein the oxysilane is selected from the group consisting of (3-aminopropyl)trimethoxysilane, (3-aminopropyl)triethoxysilane, N-(2-aminoethyl) 3-aminopropyl trimethoxysilane.

24. The process according to claim 17 further including modifying the alternative polyurethane composition with from 5 mol % to 20 mol % (relative to molar amount of the oxysilane component) of a tetrafunctional alkoxysilane of the formula (II), $Si(OR^4)_4$ (II), wherein $R^4$=straight or branched $C_1$-$C_{10}$ alkyl.

* * * * *